Patented June 29, 1943

2,322,915

UNITED STATES PATENT OFFICE 2,322,915

MANUFACTURE OF OXALIC ACID

Maxwell J. Brooks, Beverly Hills, Calif., assignor to General Chemical Company, New York, N. Y., a corporation of New York No Drawing. Application September 27, 1941, Serial No. 412,600

9 Claims. (Cl. 260—528)

This invention relates to the manufacture of oxalic acid from carbohydrates, and more particularly to the manufacture of oxalic acid by catalytic oxidation of carbohydrates with nitric acid.

It is known that oxalic acid may be prepared by the oxidation of carbohydrates such as glucose, sucrose, starch, dextrin, cellulose and the like with nitric acid. For example, United States Patent 2,057,119, issued to Simpson October 13, 1936, describes a method for manufacturing oxalic acid involving oxidizing a carbohydrate, such as glucose, with nitric acid in the presence of sulfuric acid at a temperature between about 150° and 160° F., while maintaining the carbohydrate in excess of the nitric acid during the oxidation; the patent states that vanadium pentoxide may be added to the mass to catalyze the oxidation. While this method of preparing oxalic acid has been found to yield a high-grade product in a simple and efficient manner, the yields of oxalic acid are not as large as might be desired. However, to my knowledge no successful method for obtaining higher yields of oxalic acid by catalytic oxidation of carbohydrates with nitric acid has been developed prior to my invention.

It is an object of this invention to provide a novel catalyst for use in the production of oxalic acid by oxidation of carbohydrates with nitric acid.

It is a more specific object of this invention to provide an improved method for preparing oxalic acid by catalytically oxidizing carbohydrates with nitric acid in the presence of sulfuric acid.

I have made the surprising discovery that the yields of oxalic acid obtainable by oxidizing carbohydrates with nitric acid in the presence of a vanadium catalyst may be substantially improved by conducting the oxidation in the presence of controlled amounts of iron so that the oxidation mass contains at least about 0.1%, preferably between about 0.39% and about 0.8%, ferric iron. A preferred embodiment of my invention involves catalytically oxidizing a carbohydrate such as glucose with nitric acid in the presence of sulfuric acid and a vanadium-iron catalyst at a temperature between about 150° and about 165° F. while maintaining in the reaction mass an amount of carbohydrate in excess of the amount required to react with the nitric acid, the catalyst being employed in an amount sufficient to maintain in the oxidation mass between about 0.39% and about 0.8% ferric iron, since I have found that by operating in this manner optimum yields of high-grade oxalic acid are obtained. The oxalic acid produced in accordance with my invention may be recovered by permitting the oxidation mass to cool, whereby the oxalic acid crystallizes therefrom, or may be removed from the reaction mass in any other desirable manner. In every case, it will be found that the yields of oxalic acid are substantially greater than yields obtained when vanadium alone is employed as the catalytic agent. My invention, therefore, provides a method for producing increased quantities of oxalic acid by oxidation of carbohydrates without substantially increasing the cost of production.

The oxidation of the carbohydrates with nitric acid in accordance with this invention may be carried out in any suitable manner. The carbohydrate employed is preferably a monosaccharose such as glucose, fructose and the like, although other carbohydrates such as sucrose, starch, dextrin, etc., may also be employed; however, when employing carbohydrates other than the monosaccharoses it is preferable to hydrolyse them with acid to form monosaccharoses before subjecting them to oxidation with nitric acid. The nitric acid employed in accordance with this invention may be of any suitable concentration, varying, for example, from about 60% to 95% $HNO_3$. As hereinabove pointed out, oxidation with nitric acid is preferably carried out in the presence of sulfuric acid; the concentration of the sulfuric acid in the oxidation mass may vary somewhat, but it is preferable to adjust the sulfuric acid concentration so that the mother liquor, after removal of the oxalic acid product from the oxidation mass, contains about 50% sulfuric acid, since if the sulfuric acid concentration is permitted to fall materially below this value, the oxalic acid tends to oxidize to carbon dioxide, thus reducing the yield of product. The vanadium-iron catalyst may be formed by dissolving suitable vanadium and iron compounds in the acid reaction mixture; the vanadium is preferably derived from vanadium pentoxide, whereas iron may be incorporated in the reaction mixture by dissolving iron, iron oxide or other soluble iron compounds in the acid medium.

In the practice of a preferred embodiment of this invention, which may be carried out continuously or batchwise, oxalic acid mother liquor from a previous operation, from which oxalic acid crystals have been removed and which contains about 50% sulfuric acid, is run into a reaction vessel. This liquor, in accordance with my invention, should contain dissolved therein at least about 0.1%, and preferably between about 0.39% and about 0.8%, ferric iron and between about 0.001% and about 0.05% vanadium (expressed as $V_2O_5$); if necessary, sufficient iron and vanadium, in the form of vanadium pentoxide, may be dissolved in the mother liquor to adjust the catalyst content thereof to within these preferred ranges. The maximum amount of iron present in the oxidation mass may vary, but an amount of iron in excess of that required to produce a saturated solution of iron salts in the oxidation mass at room temperature (about 70° F.) is undesirable. A mixed acid solution containing nitric acid and sulfuric acid is also prepared, a further quantity of the mother liquor serving as the source of sulfuric acid; sulfuric acid from an external source may also be added to the mixture to replace any sulfuric acid lost during the previous oxidation. The mother liquor in the reaction vessel may then be heated to 150° to 165° F.; an aqueous glucose solution containing desirably about 60% glucose, diluted with a portion of the mother liquor to increase its fluidity, and the mixed acids may then be introduced into the reaction vessel with agitation, the temperature being maintained between about 150° and about 165° F. The rates of addition of the glucose and mixed acid solutions, and the concentrations of these solutions, are regulated so that an excess of glucose is maintained in the reaction mass during the course of and up to completion of the oxidation. Nitrogen oxide vapors which are evolved may be collected in an absorber and the acid thus recovered used as desired. When the oxidation has proceeded to completion the oxidation mass may be permitted to cool, the oxalic acid which crystallizes therefrom removed by filtration, and the mother liquor then employed as hereinabove described. If desired, the crystallized oxalic acid may be purified by dissolving the mass in water containing a small amount of sulfuric acid at a temperature of about 150° F., permitting the solution to cool, crystallizing the oxalic acid with slow agitation to permit the formation of large crystals, recovering the crystals by filtration and drying. The filtrate obtained in the purification step, which may still contain some oxalic acid, may be concentrated and additional oxalic acid recovered therefrom by crystallization. When carrying out the above method continuously, the glucose and mixed acid solution are continuously added at rates such that the vessel contains over 99% reaction product, this product being continuously withdrawn from the vessel to the crystallizer.

Another suitable method for carrying out my invention adapted for batchwise operation involves introducing oxalic acid mother liquor recovered from a previous batch and containing about 50% sulfuric acid and the vanadium-iron catalyst to a reaction vessel, adjusting its vanadium and iron content, if necessary, to within the preferred ranges above mentioned, incorporating additional sulfuric acid therein to make up for sulfuric acid lost in the previous batch, adding a solution of glucose to the mother liquor thus treated, heating the mass to between about 150° and about 165° F. and introducing nitric acid into the mass while maintaining the temperature within the above range until oxidation is complete. At the end of the oxidation the oxalic acid product may be recovered as hereinabove described.

The following examples are illustrative of my invention. Amounts are given in parts by weight.

*Example 1.*—Raw starch (containing 85.45% starch) was hydrolyzed by gradually dissolving the starch in an 11% oxalic acid solution at a temperature between about 167° and 176° F. in the proportion of 42.72 parts of starch (100%) per 57.28 parts of solution, and refluxing the solution thus formed for six hours; the starch was thereby hydrolyzed, chiefly to glucose. 800 parts of this hydrolyzed starch solution were mixed with 2696 parts of oxalic acid mother liquor recovered from a previous operation and containing 46.77% sulfuric acid, 5.46% oxalic acid, 0.64% ferric iron, and 0.00187% vanadium (expressed as $V_2O_5$). The solution was then heated to 160° F. and 905 parts of 95% nitric acid were added thereto over a period of three hours. The mass was maintained at 160° F. for an additional two hours, during which time 59.5 parts of 95% nitric acid were added to complete the oxidation; it was then cooled to 90° F. and the oxalic acid crystals which formed were separated from the mother liquor. The yield of oxalic acid amount to 1.653 parts of acid per part of starch.

*Example 2.*—800 parts of hydrolyzed starch prepared as described in Example 1 were mixed with 2280 parts of oxalic acid mother liquor containing 55.36% sulfuric acid, 4.23% oxalic acid, 0.39% ferric iron and 0.005% vanadium (expressed as $V_2O_5$). The solution was then heated to 160° F., and 1318 parts of 65% nitric acid gradually added thereto while maintaining the mass at 160° F.; when oxidation was completed the mass was permitted to cool to 90° F. and oxalic acid crystals which formed were separated from the mother liquor. The yield of oxalic acid amounted to 1.653 parts of acid per part of starch.

Two samples of hydrolyzed starch were also oxidized under the same conditions described in the above examples, except that in one case a vanadium catalyst containing no iron was used and in the other an iron catalyst containing no vanadium was employed. The results, compared with the results obtained in the practice of Examples 1 and 2, are shown in the following table:

| Per cent catalysts in mother liquor | | Oxalic acid acid produced per part of starch | Per cent total starch converted to oxalic acid |
|---|---|---|---|
| Fe | $V_2O_5$ | | |
| 0.64 | 0.00187 | 1.653 | 70.64 |
| 0.39 | 0.005 | 1.653 | 70.64 |
| 0.70 | None | 0.754 | 32.22 |
| None | 0.0025 | 1.413 | 60.38 |

From the above description it will be evident that my invention provides a simple and effective method for substantially increasing the yields of oxalic acid produced by the oxidation of carbohydrates with nitric acid. Hence, my invention will undoubtedly be of great interest to those engaged in the production of this product.

It is to be understood that the iron is not present in the oxidation mass as free iron, but as dissolved iron salts such as ferric sulfate, if sulfuric acid is present, or ferric nitrate; the iron content of the oxidation mass is expressed, however, for purposes of convenience in terms of free ferric iron representing the free iron equivalent of the iron salt content of the mass.

Since certain changes may be made in carrying out the above method without departing from the scope of the invention, it is intended that all matter contained in the above description shall be interpreted as illustrative and not in a limiting sense.

I claim:

1. In the method for preparing oxalic acid by oxidation of carbohydrates with nitric acid in the presence of a vanadium catalyst, the improvement which comprises conducting the oxidation in the presence of at least about 0.1% ferric iron.

2. In the method for preparing oxalic acid by oxidation of carbohydrates with nitric acid in the presence of a vanadium catalyst, the improvement which comprises conducting the oxidation in the presence of an amount of iron equivalent to at least about 0.1% ferric iron and not greater than the amount required to produce a saturated solution of iron salts in the oxidation mass at room temperature.

3. In the method for preparing oxalic acid by oxidation of carbohydrates with nitric acid in the presence of a vanadium catalyst, the improvement which comprises conducting the oxidation in the presence of controlled amounts of iron so that the oxidation mass contains between about 0.39% and about 0.8% ferric iron.

4. In the method for preparing oxalic acid by oxidation of carbohydrates with nitric acid in the presence of sulfuric acid and a vanadium catalyst, the improvement which comprises conducting the oxidation in the presence of controlled amounts of iron so that the oxidation mass contains between about 0.39% and about 0.8% ferric iron.

5. In the method for preparing oxalic acid by oxidation of a monosaccharose with nitric acid in the presence of sulfuric acid and a vanadium catalyst, the improvement which comprises conducting the oxidation in the presence of controlled amounts of iron so that the oxidation mass contains between about 0.39% and about 0.8% ferric iron.

6. An improved method for preparing oxalic acid which comprises oxidizing a carbohydrate with nitric acid in the presence of sulfuric acid and a mixed vanadium-iron catalyst at a temperature between about 150° and 165° F., the relative amounts of carbohydrate and nitric acid being such that an excess of the carbohydrate is present in the reaction mass, and the amount of catalyst being such that the mass contains between about 0.39% and about 0.8% ferric iron, permitting the oxidation mass to cool, whereby oxalic acid crystallizes therefrom, and recovering oxalic acid from the cooled mass.

7. An improved method for preparing oxalic acid which comprises oxidizing a monosaccharose with nitric acid in the presence of sulfuric acid and a mixed vanadium-iron catalyst at a temperature between about 150° and 165° F., the relative amounts of carbohydrate and nitric acid being such that an excess of the carbohydrate is present in the reaction mass, and the amount of catalyst being such that the mass contains between about 0.001% and about 0.05% vanadium (expressed as $V_2O_5$) and between about 0.39% and about 0.8% ferric iron, permitting the mass to cool, whereby oxalic acid crystallizes therefrom, and recovering the oxalic acid from the cooled mass.

8. An improved method for preparing oxalic acid which comprises forming a solution of a carbohydrate in aqueous oxalic acid mother liquor obtained from a previous operation and having a sulfuric acid concentration of about 50%, an iron content between about 0.39% and about 0.8% ferric iron and a vanadium content between about 0.001% and about 0.05% vanadium (expressed as $V_2O_5$), forming a mixed acid solution of mother liquor and nitric acid, introducing a further quantity of mother liquor into a reaction zone, heating the mother liquor in the reaction zone to between about 150° and about 165° F., adding thereto the carbohydrate solution and the mixed acid solution in such manner as to maintain in the resulting reaction mass an excess of carbohydrate, whereby the carbohydrate is oxidized to oxalic acid, maintaining the temperature of the reaction during the oxidation of the carbohydrate between about 150° and about 165° F. and recovering oxalic acid.

9. An improved method for preparing oxalic acid which comprises introducing into a reaction zone aqueous oxalic acid mother liquor obtained from a previous operation and having a sulfuric acid concentration of about 50%, an iron content between about 0.39% and about 0.8% ferric iron and a vanadium content between about 0.001% and about 0.05% vanadium (expressed as $V_2O_5$), introducing into the reaction zone an aqueous solution of a carbohydrate, heating the mass in the reaction zone to between about 150° and about 165° F., introducing nitric acid into the reaction zone whereby the carbohydrate is oxidized to oxalic acid, maintaining the temperature of the reaction during oxidation between about 150° and about 165° F. and recovering oxalic acid.

MAXWELL J. BROOKS.